United States Patent [19]

Dwyer et al.

[11] Patent Number: 4,598,587
[45] Date of Patent: Jul. 8, 1986

[54] SURFACE ACOUSTIC WAVE ACCELEROMETER

[75] Inventors: Douglas F. G. Dwyer, Bishops Stortford; David E. Bower, London, both of England

[73] Assignee: Standard Telephones & Cables, plc, Harlow, England

[21] Appl. No.: 631,249

[22] Filed: Jul. 16, 1984

[30] Foreign Application Priority Data

Aug. 4, 1983 [GB] United Kingdom ............... 8321091

[51] Int. Cl.[4] ............................................. G01P 15/08
[52] U.S. Cl. .................................... 73/517 R; 310/329
[58] Field of Search ................ 73/517 R; 310/313 R, 310/313 B, 329

[56] References Cited

U.S. PATENT DOCUMENTS 4,306,456 12/1981 Maerfeld ........................... 73/517 R
4,515,016 5/1985 Hartemann et al. ............... 73/517 R

FOREIGN PATENT DOCUMENTS 2117115 3/1982 United Kingdom ............ 73/517 R

Primary Examiner—Jerry W. Myracle
Assistant Examiner—John E. Chapman, Jr.
Attorney, Agent, or Firm—Kerkam, Stowell, Kondracki & Clarke

[57] ABSTRACT

An accelerometer comprises a quartz beam 1 having on its upper and lower faces surface acoustic wave devices 2, 3 and 2', 3'. The beam is centrally mounted on quartz spacers 4, 5 which have metallized contacts for the lower SAW device. The spacers are carried on a quartz substrate 6 which is supported on a header 7 forming the base of a dual-in-line package. Mass-loading 8 is provided on each end of the beam 1.

9 Claims, 2 Drawing Figures

SURFACE ACOUSTIC WAVE ACCELEROMETER

This invention relates to a surface acoustic wave accelerometer utilising differential surface acoustic wave devices on either side of a resilient beam of surface acoustic wave material, the beam being mounted so that acceleration forces result in a bending of the beam.

Our British patent application No. 8208434 discloses such an accelerometer, the beam being a quartz beam mounted either at one end only, as a simple cantilever, or at both ends. The output signals of two surface acoustic wave devices are typically mixed to produce sum and/or difference outputs the values of which are related to the amount of acceleration.

According to the present invention there is provided a surface acoustic wave accelerometer utilising surface acoustic wave devices on either side of a resilient beam wherein the beam is centrally mounted to provide a balanced structure.

An embodiment of the invention is now described with reference to the accompanying drawings in which.

Figure 1:
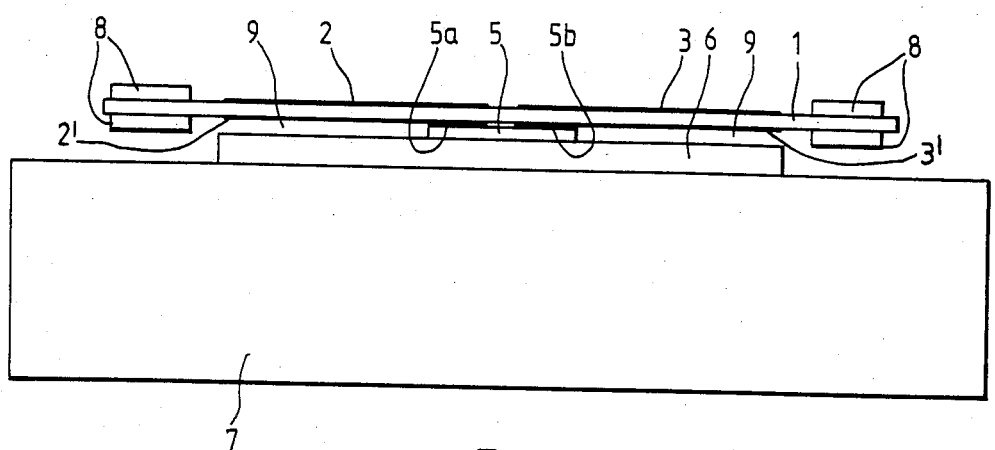
FIG. 1 illustrates a surface acoustic wave accelerometer in side elevation.
Figure 2:
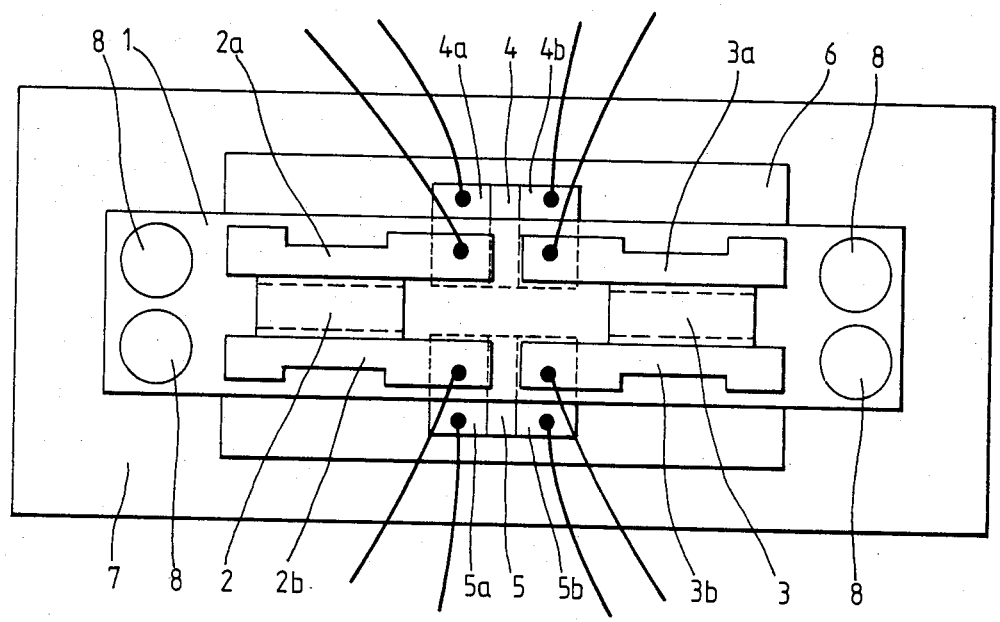
FIG. 2 illustrates the accelerometer of FIG. 1 in plan view.

The accelerometer illustrated comprises a quartz beam 1 having on its upper and lower surfaces substantially identical surface acoustic wave delay lines or resonators. The upper device is formed by input and output transducers 2, 3 which are conventional metallized interdigitated electrode patterns. Each transducer is placed between and is served by two large metallized areas 2a, 2b, 3a, 3b respectively, which act as electrical bus-bar connections for the transducers. The lower device is similarly constructed with metallizations 2', 3'. The beam is centrally supported on two quartz spacers 4, 5 which are in turn bonded to a quartz substrate 6. The gap between the two spacers 4, 5 is large enough to provide an unimpeded propagation for surface acoustic waves between the transducers 2' and 3' of the lower SAW device. The substrate 6 is bonded to a mechanical support or header 7, e.g. the base portion of an enclosure. Each spacer 4, 5 has two metallized contacts 4a, 4b, 5a, 5b positioned on it and the beam 1 is affixed to the spacers by electrically conducting adhesive, e.g. a metallic loaded epoxy resin, whereby electrical connections can be made to the lower SAW device. Wire bonded leads are attached to the metallized contacts 4a, 4b, 5a, 5b and to the metallized areas 2a, 2b, 3a, 3b, the other ends of the wires being bonded to e.g. terminal pins (not shown) of a dual-in-line package. Mass loading of the beam ends is accomplished by sticking cylindrical weights 8 onto the upper and lower surfaces of the beam adjacent the ends. The dimensioning of the substrate 6 relative to the beam 1 and the weights 8 is such that the narrow gap 9 between the beam 1 and the substrate 6 provides a measure of air damping, preventing the beam from flexing under severe acceleration to the point where it strikes the substrate.

The SAW accelerometer structure disclosed herein provides a balanced device with easy electrical connections which do not interfere with the operation of the device. Also, center mounting the beam allows the SAW devices to be located at the position of maximum beam strain thereby maximizing device sensitivity.

Central mounting of the beam also reduces or eliminates sensitivity of the device to acceleration forces orthogonal to the required direction of measurement, i.e. acceleration in a direction substantially parallel to the long axis of the beam. Finally, the structure illustrated is adapted for ease of manufacture and simplicity of assembly.

We claim:

1. A surface acoustic wave accelerometer including a respective surface acoustic wave device on each of two opposing surfaces of a resilient beam, wherein the beam has a portion central of its length by which it is mounted to a substrate with one beam surface facing the substrate, to provide a balanced structure, and wherein each surface acoustic wave device has a respective pair of transducers, the transducers of each pair being disposed on opposite sides of said beam central portion whereby surface acoustic waves produced by said devices propagate between the respective transducers and across said beam central portion.

2. An accelerometer according to claim 1 wherein the beam is mounted to the substrate via fixed spacers, the fixed spacers carrying electrical contacts which provide electrical connection for the surface acoustic wave device on said one beam surface, the beam being bonded to the fixed spacers by electrically conductive adhesive.

3. An accelerometer according to claim 2 wherein the beam and the spacers are quartz.

4. An accelerometer according to claim 3 wherein the substrate is of quartz and the spacers are affixed to the quartz substrate which is intermediate the spacers and a mechanical support.

5. An accelromenter according to claim 4 wherein between the quartz substrate and each end of the beam there is a respective gap, which gaps are dimensioned to effect air damping of the beam.

6. An accelerometer according to claim 1 including mass loading on each surface of the beam adjacent each end of the beam.

7. An accelerometer according to claim 2 wherein the surface acoustic wave devices are resonators.

8. A method of mounting a surface acoustic wave accelerometer, the surface acoustic wave accelerometer including a respective surface acoustic wave device on each of the opposing surfaces of a resilient device, each surface acoustic wave device having a pair of transducers, the transducers of each pair being disposed on opposite sides of a portion of the beam central of its length whereby surface acoustic waves produced by said devices propagate between the respective transducers and across said beam central portion, the method including the step of affixing the central portion of the beam to a substrate, with one beam surface facing the substrate via fixed spacers whereby a balanced beam structure is formed, there being a gap between said fixed spacers whereby to provide unimpeded propagation for surface acoustic wave between the transducers of the surface acoustic wave device on said one beam surface.

9. A method according to claim 8 including dimensioning a respective air gap between each end of the beam and the substrate to provide a measure of air damping when the beam flexes under the acceleration forces.

* * * * *